Patented July 1, 1947

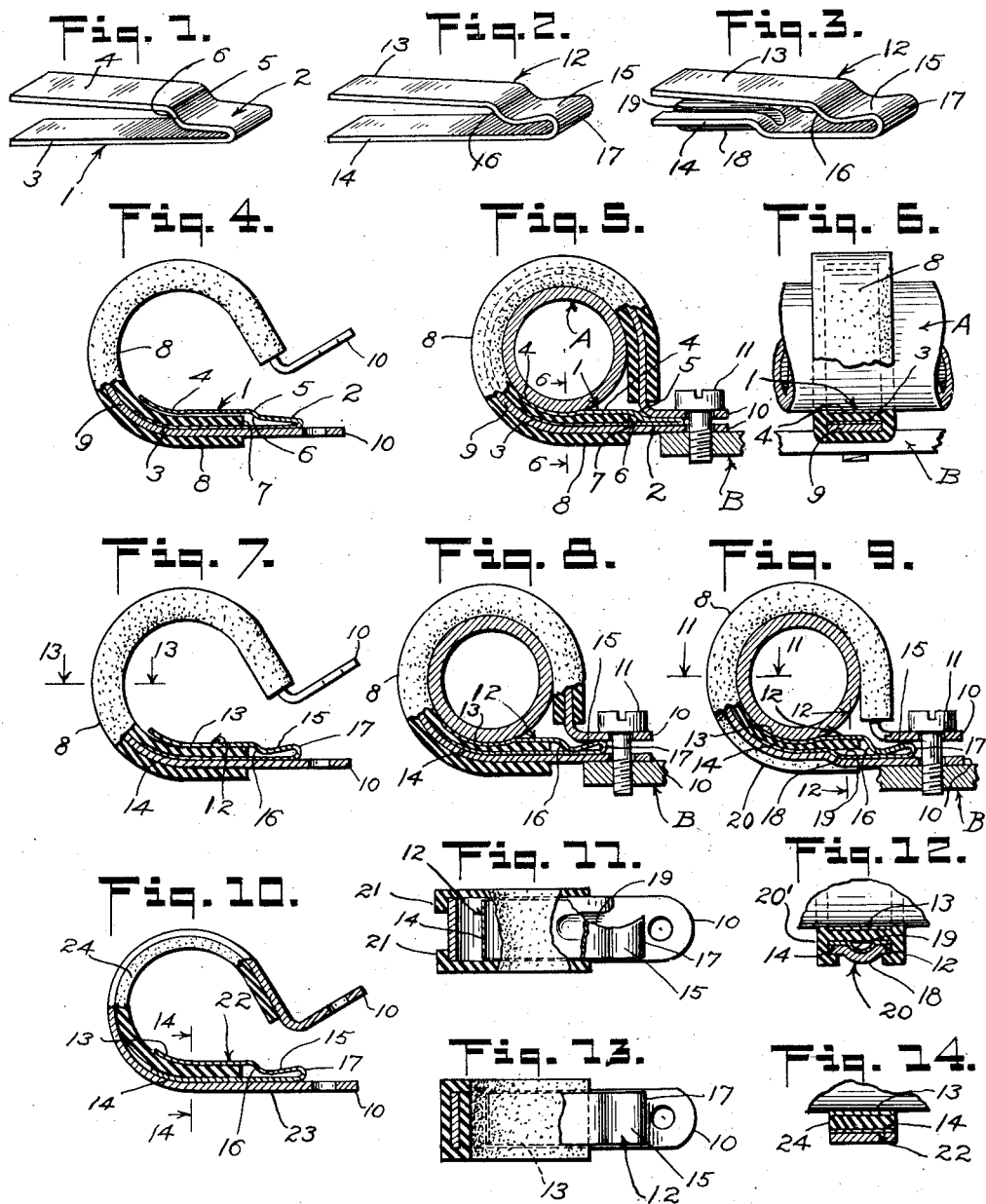

2,423,222

UNITED STATES PATENT OFFICE 2,423,222

CONDUIT SUPPORTING CLIP

Reni S. Berry, Los Angeles, Calif., assignor to Adel Precision Products Corp., a corporation of California Application December 31, 1942, Serial No. 470,870

6 Claims. (Cl. 174—40)

This invention relates to aircraft conduit supporting clips of the type wherein a conduit-embracing cushion of compressible and insulation material is supported by a metal strap having opposed ends which are brought together to clamp the cushion and strap around the conduit, and more particularly pertains to an improved bonding element which may be made up as a part of the clip or inserted in the clip in the field or on the job and constitutes a rugged and efficient bonding element which assures an effective "grounding" of the conduit line to the metal structure of an aircraft regardless of vibration and other factors tending to impair the bonding action, also simplifies and reduces the cost of manufacture of such clips and makes possible an easy replacement of the bonding element in the field without requiring the removal of the cushion or a complete disassembling of the clip.

One of the objects of my invention is to provide a conduit supporting clip of the character described wherein a metallic bonding member has conduit-engaging portion on the cushion and a free portion arranged to be clamped between and in contact with the ends of the metal strap whereby said member is securely but removably held in place and reliably establishes and maintains an electrical connection between the conduit and the strap while the latter is held in electrical contact with the metallic framework of an aircraft.

Another object of my invention is to provide a conduit supporting clip such as described having a metallic bonding strip which is doubled to provide a portion inserted between the metal strap and the cushion, a portion lying on the cushion for contact with the conduit, and a free portion extending between the ends of the strap to be clamped and held thereby, it being unnecessary to fix the bonding strip to the cushion or to the strap and it being possible to readily and easily insert or replace the strip on the job or in the field inasmuch as the strip is removably held in place by reason of the portion thereof inserted between the strap and the cushion, and the portion which is clamped between the ends of the strap.

Another object is to provide a doubled bonding strip such as described which is constructed and arranged to resist impairment or rupture at the point where clamped in place between the ends of the strap as well as throughout the strip, this impairment or rupture being heretofore caused by the lateral displacement and lever action of the strip due to the vibratory movement of the conduit and the tendency to break or tear loose where it is welded or otherwise permanently fixed to the metal strap.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a bonding element embodying my invention;

Fig. 2 is a perspective view of a modified form of the bonding element hereof;

Fig. 3 is a perspective view of another modified form of the bonding element hereof;

Fig. 4 is a fragmentary part elevational, part sectional view of a conduit clip equipped with the bonding element shown in Fig. 1;

Fig. 5 is a view similar to Fig. 4 showing the clip installed;

Fig. 6 is a part elevational, part sectional view taken at right angles to Fig. 5 and in part on the line 6—6 of Fig. 5;

Fig. 7 is a side elevational and part sectional view of a conduit clip equipped with the modified form of bonding element shown in Fig. 2;

Fig. 8 is a view showing the clip of Fig. 7 as when completely installed;

Fig. 9 is a view corresponding to Fig. 8 of a clip equipped with the form of bonding element shown in Fig. 3;

Fig. 10 is a part sectional, part side elevational view of another modified form of the invention;

Fig. 11 is a partial top plan and sectional view of the clip shown in Fig. 9;

Fig. 12 is a fragmentary sectional view taken on the line 12—12 of Fig. 9;

Fig. 13 is a fragmentary sectional view taken on the line 13—13 of Fig. 10;

Fig. 14 is a fragmentary sectional view taken on the line 14—14 of Fig. 10.

Referring to the drawings more specifically, particularly Figs. 1, 4, 5, and 6, it is seen that one embodiment of the electrical bonding element or conductor hereof comprises a relatively thin metallic strip 1 which is bent back on itself to define a doubled portion 2 and opposed spaced-apart leg portions 3 and 4. These leg portions are normally spaced apart a greater extent than the doubled portion 2 by reason of an off-setting bend 5 made at the juncture of the leg portion 4 with the doubled portion 2. This bend defines a shoulder 6 which is adapted to engage an end 7 of a conduit-embracing cushion 8 of a conduit-supporting clip. The cushion 8 is formed of rubber, synthetic rubber or like compressible and insulation material, and as here shown is tubular and mounted on a metallic conduit-embracing strap 9. As here provided the strap 9 has opposed apertured ends 10 projecting beyond the ends of the cushion and adapted to be brought together by means of a screw 11 or the like to clamp the cushion and strap around the conduit A and also secure the strap to a metallic frame member B of an aircraft or the like.

In accordance with my invention the leg 3 of the bonding element is inserted between the cushion 8 and the strap 9 so as to contact the strap, while the leg 4 rests on the cushion in position to engage the conduit A, and the doubled portion 2 extends between the ends 10 of the strap as shown in Figs. 4 and 5. The shoulder 6 engages the end 7 of the cushion 8 and limits the inward extension of the legs 4 and 5 to a position in which the doubled portion 2 is disposed between the ends 10 as shown in Figs. 4 and 5.

It is now seen that where a substantially non-tensioned and readily bendable or inert metal is used for the bonding strip 1, the opposed parts of the doubled portion 2 will be pressed together in close contact with one another and the ends 10, when the screw 11 is tightened to properly clamp the clip on the conduit and secure the clip of the structural part B. Thus clamped between the ends 10, the bonding element is securely held in such manner that the legs 3 and 4 will properly contact the strap and conduit respectively and so remain regardless of the longitudinal and other vibratory movements which tend to dislodge or derange the bonding element.

It should be noted that the bonding element hereof may be embodied as a part of the clip as shown in Fig. 1, either at the time of manufacture or in the field, and that it may be readily and easily replaced at will without removing the cushion or disassembling the clip other than removing the fastening element 11.

It is now seen that the bonding strip or conductor hereof has a conduit-engaging portion overlying the cushion, and a free "end" portion extended so that it will be clamped between and in electrical contact with the ends of the strap to securely and removably hold the strip in place and maintain a reliable electrical connection between the conduit and the strap.

It should be noted that where the bonding strip is bent back on itself there is defined a pronounced curved portion having a curve of at least 170 degrees to better resist and accommodate stresses during use of the device, especially at 17 in the tensioned forms of the bonding element shown for example in Figs. 2 and 3.

A modified form of the invention shown in Figs. 2, 7, and 8 comprises bonding element 12 formed of a thin metal strip in the same manner as the first described element but wherein the strip is formed of spring or resilient metal. This tensioned element has opposed legs 13 and 14, a doubled portion 15, and a shoulder 16 all in the same arrangement as the device shown in Fig. 1. The curve at the return bend 17 is not less than 170 degrees to relieve and accommodate stresses, and is wider than the return bend shown in Fig. 1. When a clip as here provided is equipped with this form of bonding element as shown in Figs. 2, 7, 8 and 13, and the ends of the clip are clamped together, the doubled portion 15 is held tightly therebetween as shown in Fig. 8 but is not collapsed as is the doubled portion in the first form of the invention. This arrangement provides a tensioned leg 13 overlying the cushion for effective engagement with the conduit also maintains the desired curve at 17 to accommodate stresses.

Another modified form of my invention as shown in Figs. 3, 9, 11 and 12 consists in the provision of a longitudinal rib 18 in the leg 14 of a bonding element corresponding to the one 12 shown in Fig. 3, which rib is adapted to seat in groove 19 in the metal strap 20 to interlock the bonding element and strap. Said rib 14 and groove 19 occupy only the mid-width portions of the bonding strip's leg 14 and metal strap, respectively, the flat, abutting faces of these parts along each side of the groove and rib preventing lateral displacement of the bonding strip, which might occur if these two members were arcuate across their entire widths. The cushion 20 in this form is provided with marginal flanges 21 instead of being tubular, to hold it on the strap and the space between these flanges accommodates the rib-groove formation as shown in Fig. 12. In all other respects this form of my invention is the same as that shown in Figs. 2, 7, 8 and 13.

Figs. 10, 13 and 14 show another modified form of this invention wherein the bonding element 22 is the same as that shown in Fig. 2 and the metal strap 23 is the same as that employed in Figs. 5 and 8, while the cushion 24 is in strip form and cemented or otherwise adhered to the strap instead of being of tubular form or flanged.

In all the embodiments of the invention, owing to the disconnected relation of the bonding strip to the supporting strap, said strip may be made of a thinner sheet material and of a different quality as to resiliency and in other particulars.

I claim:

1. In a bonding element for application to a conduit clip which latter includes a conduit-embracing cushion and a metal strap supporting said cushion and having opposed ends adapted to be brought together to clamp the cushion and strap around a conduit, the improvement which consists of a bonding element adapted to be applied to and removed from such a clip without disassembling the clip, said element comprising a relatively thin and flexible metallic strip bent back on itself to define opposed elongated legs adapted to be positioned astride an end of the cushion; said legs having opposed portions arranged to extend longitudinally of opposite faces of the cushion for contact with the strap and conduit respectively, said legs having other opposed portions arranged to extend longitudinally of said ends of the strap in position to be forced into contact with one another and said end of the strap and to be clamped between said ends, said strip being formed of resilient metal whereby the legs are tensioned.

2. In a bonding element for application to a conduit clip which latter includes a conduit-embracing cushion and a metal strap supporting said cushion and having opposed ends adapted to be brought together to clamp the cushion and strap around a conduit, the improvement which consists of a bonding element adapted to be applied to and removed from such a clip without disassembling the clip, said element comprising a relatively thin and flexible metallic strip bent back on itself to define opposed elongated legs adapted to be positioned astride an end of the cushion; said legs having opposed portions arranged to extend longitudinally of opposite faces of the cushion for contact with the strap and conduit respectively, said legs having other opposed portions arranged to extend longitudinally of said ends of the strap in position to be forced into contact with one another and said ends of the strap and to be clamped between said ends, and a longitudinal rib on one of said legs for contact with said strap.

3. In a bonding element for application to a conduit clip which latter includes a conduit-embracing cushion and a metal strap supporting said cushion and having opposed ends adapted to be brought together to clamp the cushion and strap around a conduit, the improvement which consists of a bonding element adapted to be applied to and removed from such a clip without disassembling the clip, said element comprising a relatively thin and flexible metallic strip bent back on itself to define opposed elongated legs adapted to be positioned astride an end of the cushion; said legs having opposed portions arranged to extend longitudinally of opposite faces of the cushion for contact with the strap and conduit respectively, said legs having other opposed portions arranged to extend longitudinally of said ends of the strap in position to be forced into contact with one another and said ends of the strap and to be clamped between said ends, said legs being of substantially the same length and width throughout their extent, and narrower than the strap and cushion.

4. In a bonding element for application to a conduit clip which latter includes a conduit-embracing cushion and a metal strap supporting said cushion and having opposed ends adapted to be brought together to clamp the cushion and strap around a conduit, the improvement which consists of a bonding element adapted to be applied to and removed from such a clip without disassembling the clip, said element comprising a relatively thin and flexible metallic strip bent back on itself to define opposed elongated legs adapted to be positioned astride an end of the cushion, said legs having opposed portions arranged to extend longitudinally of opposite faces of the cushion for contact with the strap and conduit respectively, said legs having other opposed portions arranged to extend longitudinally of said ends of the strap in position to be forced into contact with one another and said ends of the strap and to be clamped between said ends, there being a shoulder intermediate the ends of one of the legs adapted to contact said end of the cushion.

5. In a conduit supporting clip, a metal conduit-embracing strap having opposed ends adapted to be forced together to clamp the strap in place, a relatively thin and flexible metallic bonding strip, and a conduit-embracing cushion mounted on said strap so as to provide for the free insertion and removal of a part of the bonding strip between the cushion and the strap from one end of the cushion, said bonding strip being bent back on itself to provide opposed legs, one of said legs being removably and longitudinally extended from one end of the cushion so as to lie between the cushion and the strap in contact with the latter, the other of said legs being extended longitudinally from said end of the cushion so as to overlie the cushion for contact with the conduit; there being portions of both legs projecting from said end of the cushion longitudinally between said ends of the strap and adapted to be forced into contact with one another and said ends of the strap when the latter are forced together.

6. In a conduit supporting clip, a metal conduit-embracing strap having opposed ends adapted to be forced together to clamp the strap in place, a relatively thin and flexible metallic bonding strip, and a conduit-embracing cushion mounted on said strap so as to provide for the free insertion and removal of a part of the bonding strip between the cushion and the strap from one end of the cushion, said bonding strip being bent back on itself to provide opposed legs, one of said legs being removably and longitudinally extended from one end of the cushion so as to lie between the cushion and the strap in contact with the latter, the other of said legs being extended longitudinally from said end of the cushion so as to overlie the cushion for contact with the conduit; there being portions of both legs projecting from said end of the cushion longitudinally between said ends of the strap and adapted to be forced into contact with one another and said ends of the strap when the latter are forced together, the portions of the legs which project from said end of the cushion being closer to one another than the remainder of said legs to limit the extension of said legs longitudinally of and upon said cushion and strap.

RENI S. BERRY.

REFERENCES CITED

The following references are of record in the file of this patent:

UNITED STATES PATENTS

| Number | Name | Date |
| --- | --- | --- |
| 2,279,866 | Ellinwood | Apr. 14, 1942 |
| 2,250,280 | Starbird | July 22, 1941 |
| 2,310,622 | Ellinwood | Feb. 9, 1943 |
| 2,338,145 | Webb | Jan. 4, 1944 |
| 617,962 | Kirby | Jan. 17, 1899 |
| 1,704,075 | Brown | Mar. 5, 1929 |
| 2,395,926 | Webb | Mar. 5, 1946 |